W. G. COX.
SECTIONAL WIND SHIELD.
APPLICATION FILED JAN. 25, 1910.
982,658.
Patented Jan. 24, 1911.
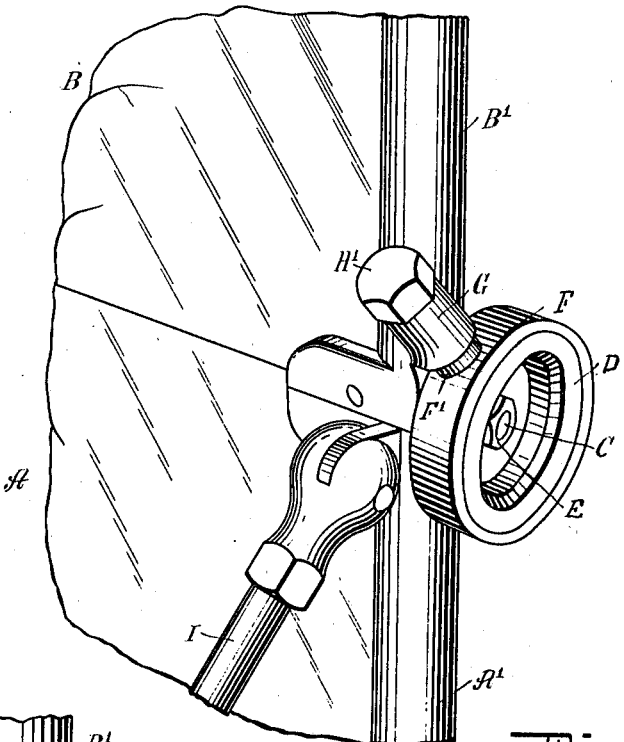
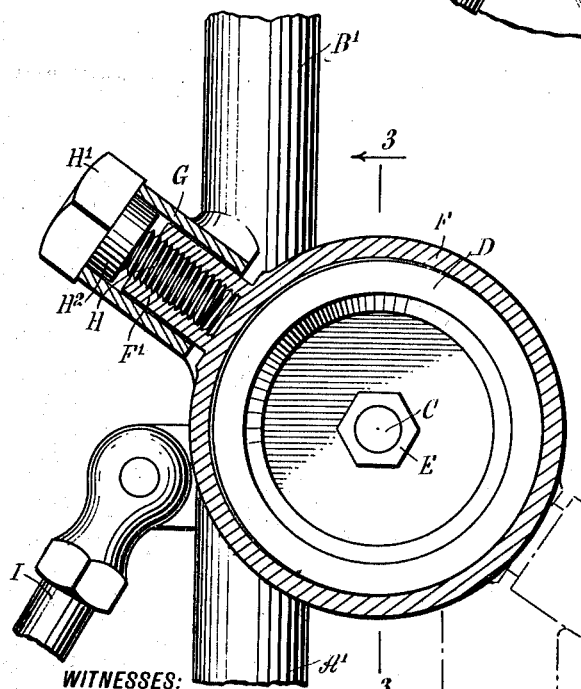
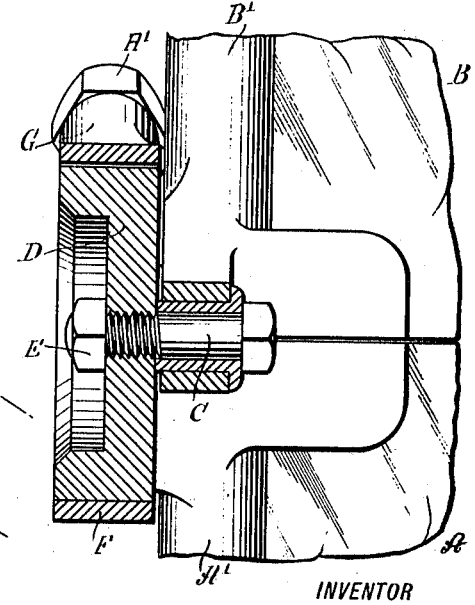
INVENTOR
William George Cox

UNITED STATES PATENT OFFICE.

WILLIAM GEORGE COX, OF ALBANY, NEW YORK.

SECTIONAL WIND-SHIELD.

982,658.  Specification of Letters Patent.  Patented Jan. 24, 1911.

Application filed January 25, 1910. Serial No. 540,066.

*To all whom it may concern:*

Be it known that I, WILLIAM GEORGE COX, a citizen of the United States, and a resident of Albany, in the county of Albany and State of New York, have invented new and useful Improvements in Sectional Wind-Shields, of which the following is a full, clear, and exact description.

The object of the invention is to provide certain new and useful improvements in sectional wind shields for automobiles and other vehicles, whereby the upper section of the shield can be readily swung upward into an extended position or downward into a folded position, or into any desired intermediate position, and to securely lock the section therein in a simple and convenient manner. For the purpose mentioned, use is made of a friction clamping device consisting essentially of two members, of which one of the members is mounted to turn with one shield section, and the other member is adjustably held on the other shield section and is in peripheral clamping engagement with the first-named member.

A practical embodiment of the invention is represented in the accompanying drawings forming a part of this specification, in which similar characters of reference indicate corresponding parts in all the views.

Figure 1 is a perspective view of a sectional wind shield, provided with a friction clamping device; Fig. 2 is an enlarged sectional side elevation of the same; and Fig. 3 is a transverse section of the same on the line 3—3 of Fig. 2.

The lower and upper sections A and B of the wind shield are pivotally connected with each other at their side frames A', B' by a pivot C, to allow of swinging the upper section B upward into an extended position, as indicated in the drawings, or downward into a folded position or into an intermediate position, as desired by the user of the automobile. The pivot C is preferably extended outwardly and threaded to screw centrally into a disk D, held against accidental displacement by a nut E, screwing on the threaded terminal of the pivot C, as plainly indicated in Fig. 3. The disk D is surrounded at its peripheral face by a clamping ring F, provided with an outwardly-extending boss F', passing into a bearing G, secured to or formed on the frame B' of the upper folding wind shield section B. The boss F' is provided with an internal screw thread, in which screws a screw H having a head H', adapted to abut against the outer end of the bearing G, the head H' having a reduced offset H², fitting into the outer end of the bearing G, to properly hold the screw H in central position. Now when the screw H is slightly unscrewed, then the upper wind shield section B can be readily swung upward and downward or into any intermediate position, and when the desired position has been reached, the operator, by the use of a wrench or other tool, turns the head H' to screw up the screw H and thus draw the boss F' outwardly, whereby the clamping ring F is drawn in firm contact with the portion of the peripheral face of the disk D opposite the boss F', as will be readily understood by reference to Fig. 2.

It is understood that the clamping ring F is drawn up against the peripheral face of the disk D with sufficient force to securely hold the upper shield section B in the desired adjusted position.

The frame A' of the lower wind shield section A, is connected in the usual manner with a brace I for holding the wind shield section A securely in vertical position.

The clamping device, shown and described, is very simple in construction and ornamental in appearance, and the several parts are not liable easily to get out of order.

Having thus described my invention, I claim as new and desire to secure by Letters Patent:

1. A sectional wind shield provided with a friction clamping device for holding the upper section in extended, folded or partly folded position, said device comprising a disk on the pivot of the sections, a ring of unbroken continuity and surrounding the disk, said ring having a member in sliding engagement with the movable section, and means engaging the member of the ring for drawing said ring into firm engagement with the peripheral face of the disk.

2. A sectional wind shield provided with a friction clamping device for holding the upper shield section in extended, folded or partly folded position, the said device comprising a disk secured on the lower shield section, a clamping ring for peripheral engagement with the said disk and having an internally threaded boss engaging a tubular bearing on the upper shield section, and a screw screwing into the said boss and abutting against the said bearing.

3. A sectional wind shield provided with a friction clamping device for holding the upper shield section in extended, folded or partly folded position, the said device comprising a disk secured on the pivot connecting the shield sections with each other, a clamping ring surrounding the peripheral face of the said disk and provided with an internally threaded boss, a tubular bearing on the said upper shield section and into which extends the said boss, and a screw screwing into the said boss and having its head abutting against the said bearing.

In testimony whereof I have signed my name to this specification in the presence of two subscribing witnesses.

WILLIAM GEORGE COX.

Witnesses:
   THEO. G. HOSTER,
   PHILIP D. ROLLHAUS.